United States Patent
Chiba

(10) Patent No.: US 10,922,974 B2
(45) Date of Patent: Feb. 16, 2021

(54) VEHICLE CONTROL DEVICE

(71) Applicant: TOYOTA JIDOSHA KABUSHIKI KAISHA, Toyota (JP)

(72) Inventor: Takashi Chiba, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 16/146,191

(22) Filed: Sep. 28, 2018

(65) Prior Publication Data

US 2019/0164429 A1 May 30, 2019

(30) Foreign Application Priority Data

Nov. 24, 2017 (JP) .............................. JP2017-225942

(51) Int. Cl.
| | |
|---|---|
| *G01C 21/28* | (2006.01) |
| *G01C 21/36* | (2006.01) |
| *G01S 13/86* | (2006.01) |
| *G01S 13/931* | (2020.01) |
| *G01S 19/14* | (2010.01) |
| *G01S 7/41* | (2006.01) |
| *G08G 1/01* | (2006.01) |

(Continued)

(52) U.S. Cl.
CPC ............ *G08G 1/163* (2013.01); *G01C 21/28* (2013.01); *G01S 7/41* (2013.01); *G01S 7/414* (2013.01); *G01S 13/86* (2013.01); *G01S 13/931* (2013.01); *G08G 1/0112* (2013.01); *G08G 1/0125* (2013.01); *G08G 1/052* (2013.01); *G08G 1/166* (2013.01); *G08G 1/167* (2013.01); *G01S 2013/9318* (2020.01); *G01S 2013/93185* (2020.01)

(58) Field of Classification Search
CPC ............ G01C 21/3602; G01C 21/3644; G01C 21/28; G08G 1/163; G08G 1/0112; G08G 1/0125; G08G 1/052; G08G 1/167; G08G 1/166; G01S 7/41; G01S 13/86; G01S 7/414; G01S 13/931; G01S 2013/9318; G01S 2013/93185; G01S 17/936; G01S 19/14
USPC ......................................................... 701/301
See application file for complete search history.

(56) References Cited

U.S. PATENT DOCUMENTS

| | | | |
|---|---|---|---|
| 2007/0075892 A1* | 4/2007 | Horibe | ...................... G06T 7/73 342/70 |
| 2016/0305794 A1* | 10/2016 | Horita | ........................ G01S 5/16 |
| 2017/0242095 A1* | 8/2017 | Schuh | .................. G05D 1/0293 |

(Continued)

FOREIGN PATENT DOCUMENTS

| | | | |
|---|---|---|---|
| JP | 2003-016599 A | | 1/2003 |
| JP | 6303830 B2 | * | 4/2018 |

*Primary Examiner* — Behrang Badii
*Assistant Examiner* — Hossam M Abd El Latif
(74) *Attorney, Agent, or Firm* — Sughrue Mion, PLLC

(57) ABSTRACT

It is estimated whether or not each of landmarks is an object to be noted for travel assist control by using an estimation line EL set in the reference frame. The estimation line EL is set to be substantially parallel to a borderline BL. The borderline BL is a line a line which separates a drivable area and an undrivable area of a vehicle. It is estimated that the landmark located on a center line CL side is the object to be noted for travel assist control. It is estimated that the landmark located on a borderline BL side is not the object to be noted for travel assist control.

7 Claims, 14 Drawing Sheets

(51) Int. Cl.
*G08G 1/16* (2006.01)
*G08G 1/052* (2006.01)

(56) References Cited

U.S. PATENT DOCUMENTS

2017/0242443 A1* 8/2017 Schuh ................ G06K 9/00791
2019/0073541 A1* 3/2019 Koravadi ........... G06K 9/00798

* cited by examiner

21: LANE SHAPE/POSITION ESTIMATION PORTION
22: LANDMARK FUSION PORTION
23: OBJECT ESTIMATION PORTION
24: DRIVE SUPPORT CONTROL PORTION
25: ESTIMATION LINE SET PORTION

21: LANE SHAPE/POSITION ESTIMATION PORTION
22: LANDMARK FUSION PORTION
23: OBJECT ESTIMATION PORTION
24: DRIVE SUPPORT CONTROL PORTION
25: ESTIMATION LINE SET PORTION
26: OBJECT RE-ESTIMATION PORTION

US 10,922,974 B2

VEHICLE CONTROL DEVICE

CROSS-REFERENCE TO RELATED APPLICATION

The present disclosure claims priority under 35 U.S.C. § 119 to Japanese Patent Applications No. 2017-225942, filed on Nov. 24, 2017. The contents of these applications are incorporated herein by reference in their entirety.

TECHNICAL FIELD

The present disclosure relates to a vehicle control device.

BACKGROUND

JP 2003-16599 A discloses a vehicle control device which is configured to determine an interrupt situation of a leading vehicle by using a signal from a wide-angle radar. This vehicle control device specifies each position of an own vehicle and the leading vehicle in x-y coordinate plane and calculates each of inter-vehicle distances in the x-axis direction, and in the y-axis direction. This vehicle control device determines that the leading vehicle has interrupted a lane on which the own vehicle travels when both of the inter-vehicle distances are equal to or less than a critical distance.

As the wide-angle radar described above, a millimeter wave radar and a LIDER ((i.e., Laser Imaging Detection and Ranging) are assumed. However, due to their characteristics, the millimeter wave radar tends to detect guard rails whereas the LIDER tends to detect poles or delineators (i.e., reflectors installed in the guard rails) standing beside the lanes. Here, the guard rails and delineators are often arranged at equal intervals along the lanes. Therefore, using such millimeter wave radar or LIDER may incorrectly recognize these roadside objects as vehicles which are traveling side-by-side with the own vehicle. Then, when the detection position of the mistaken vehicle moves in the transverse direction, a misunderstanding might occur that the same mistaken vehicle has started to the interruption of the lane on which the own vehicle travels.

The present disclosure addresses the above described problem, and an object of the present disclosure is, to provide a vehicle control device with a wide-angle radar to prevent for incorrectly recognize roadside objects which are installed at equal intervals along lanes as vehicles which are traveling side-by-side with the own vehicle.

SUMMARY

A first aspect of the present disclosure is a vehicle control device for solving the problem described above and has the following features.

The vehicle control device includes a wide-angle radar, a map database, an estimation line set portion, and an object estimation portion.

The wide-angle radar is configured to detect landmarks around an own vehicle.

The map database includes information on borderlines by which a drivable area and an undrivable area of a vehicle are separated.

The estimation line set portion is configured to execute setting processing.

The setting processing includes processing to set an estimation line around the own vehicle based on a location of the own vehicle and the information on borderlines. The estimation line extends substantially parallel to the borderline on an own vehicle side than the estimation line.

The object estimation portion is configured to execute estimation processing.

The estimation processing includes processing to estimate whether or not the landmark is an object to be noted for travel assist control including the drive control, braking control and steering control of the own vehicle.

The estimation processing includes processing:
 to determine that the landmark is the object to be noted for travel assist control when the detecting position of the same landmark is at the own vehicle side than the estimation line; and
 to determine that the landmark is not the object to be noted for travel assist control when the detecting position of the same landmark is not at the own vehicle side than the estimation line.

A second aspect of the present disclosure has the following features according to the first aspect.

The vehicle control device further comprises a relative speed calculation portion and a determined speed are set portion.

The relative speed calculation portion is configured to calculate relative speed of the landmark to the own vehicle.

The determined speed are set portion is configured to set a determination speed area in accordance with traveling speed of the own vehicle.

The estimate processing includes processing:
 to determine that the landmark is the object to be noted for travel assist control when the detecting position of the same landmark is at the own vehicle side than the estimation tine and also absolute value of the relative speed of the same landmark is within the determination sped area; and
 to determine, that the landmark is not the object to be noted for travel assist control when the absolute value of the relative speed of the same landmark is out of the determination speed area.

A third aspect of the present disclosure has the following features according to the first aspect.

The vehicle control device further includes an object re-estimation portion.

The object re-estimation portion is configured to execute re-estimation processing.

The re-estimation processing is processing to estimate again whether or not the landmark is the object to be noted for travel assist control.

The re-estimation processing includes processing to exceptionally estimate that an untargeted landmark which has been estimated not to the object to be noted for travel assist control in the estimation processing is the object to be noted for travel assist control when the detecting position of the same untargeted landmark is kept at the own vehicle side than the estimation line over a predetermined time after the execution of the estimate processing.

A fourth aspect of the present disclosure has the following features according to the second aspect.

The vehicle control device farther includes a relative speed calculation portion and an object re-estimation portion.

The relative speed calculation portion is configured to calculate relative speed of the landmark to the own vehicle.

The object re-estimation portion is configured to execute re-estimation processing.

The re-estimation processing is processing to estimate again whether or not the landmark is the object to be noted for travel assist control.

The re-estimation processing includes processing to exceptionally estimate that an untargeted landmark which has been estimated not to the object to be noted for travel assist control in the estimation processing is the object to be noted for travel assist control when the absolute value of the relative speed of the same untargeted landmark is kept larger than predetermined speed over a predetermined time after the execution of the estimate processing.

A fifth aspect of the present disclosure has the following features according to the first aspect.

The setting processing further in processing to set the estimation line by tilting the estimation line toward the own vehicle as a distance from the own vehicle to the borderline increases.

According to the first aspect, it is estimated in the estimation processing whether or not the landmark is the object to be noted for travel assist control based on a positional relationship between the detected position of the landmark and the estimation line. This estimation line is set based on the information on borderlines and the location of the own vehicle, and extends substantially parallel to the borderline on the periphery of the own vehicle side than the borderline. Therefore, according to the estimate processing, even if the detection position of any one of the roadside objects which are installed at equal intervals along limes moves in the transverse direction, it is possible to estimate that the same roadside object is not the object to be noted for travel assist control. In other words, it is possible to prevent for incorrectly recognize the same roadside object as a vehicle which is traveling side-by-side with the own vehicle.

According to the second aspect, it is estimated in the estimation processing whether or not the landmark is the object to be noted for travel assist control based the positional relationship between the detected position of the same landmark and the estimation line and also a magnitude relationship between the relative speed of the same landmark and the determination speed area. Therefore, it is possible with high probability to prevent for incorrectly recognize the roadside object as the vehicle which is traveling side-by-side with the own vehicle.

According to the third aspect, it is estimated again in the re-estimation processing whether or not the untargeted landmark is the object to be noted for travel assist control based on the detecting position of the untargeted landmark. In other words, the untargeted landmark is revaluated. Therefore, it is possible to prevent a landmark which should originally be treated as a targeted landmark from being treated as the untargeted landmark.

According to the fourth aspect, it is estimated again in the re-estimation processing whether or not the untargeted landmark is the object to be noted for travel assist control based on the relative speed of the untargeted landmark. Therefore, it is possible to prevent a landmark which should originally be treated as a targeted landmark from being treated as the un targeted landmark.

According to the fifth aspect, the estimation line is set in the setting processing by tilting the estimation line toward the own vehicle as a distance from the own vehicle to the borderline increases. Therefore, it is possible to execute the estimation processing taking into consideration accuracy of recognition in the transverse direction, which tends to decrease as the distance from own vehicle to borderline increases.

DESCRIPTION OF EMBODIMENTS

Figure 1:
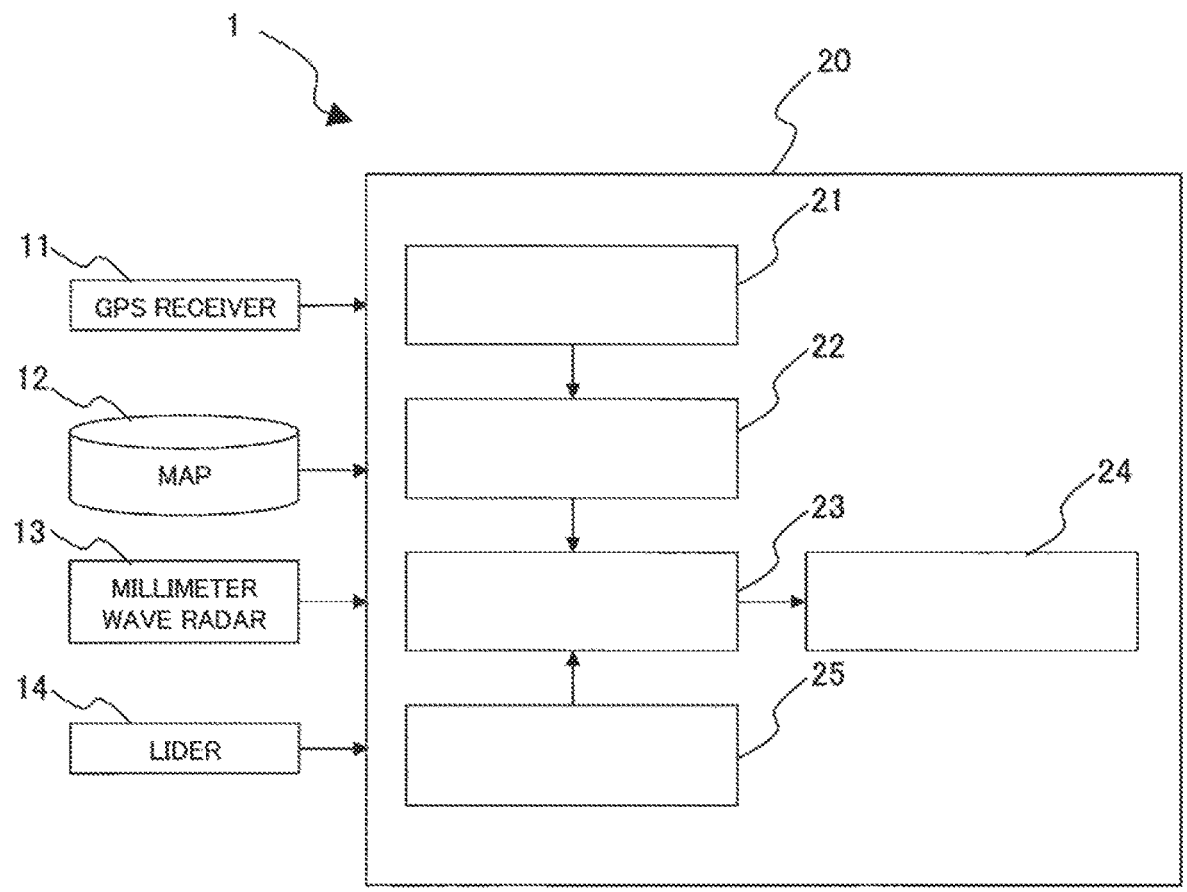
FIG. 1 is a block diagram for showing a configuration of a vehicle control device according to a first embodiment of the present disclosure.

Hereinafter, embodiments of the present disclosure will be described based on the accompanying drawings. Note that elements that are common to the respective drawings are denoted by the same reference characters and a duplicate description thereof is omitted. Further, the present disclosure is not limited to Le embodiments described hereinafter.

First Embodiment

A first embodiment of the present disclosure will be described with reference to FIGS. 1 to 11.

1. Configuration of Vehicle Control Device

FIG. 1 is a block diagram for describing a configuration of a vehicle control device according to the first embodiment. A vehicle control device 1 shown in FIG. 1 is mounted on a vehicle. The vehicle control device 1 recognizes landmarks existing in front, side or rear of the vehicle. The landmark is a moving object such as walker, bicycle, motorcycle, vehicle and a fixed object such as street plant telephone pole, curb stone, road structure. The road structure include a structure installed in a side strip such as guard rail, road sign, pole, retaining wall, noise barrier. The vehicle control device 1 automatically executes various travel assist control for the vehicle. Alternatively, the vehicle control device 1 automatically executes the various travel assist control after obtaining permission of a driver of the vehicle.

In the present disclosure, the vehicle equipped with the vehicle control device 1 is mounted is also referred to as an "own vehicle OV".

The vehicle control device 1 includes a global positioning system (GPS) receiver 11, a map database 12, a millimeter wave radar 13, a LIDAR (i.e., Laser Imaging Detection and Ranging) 14, and a vehicle support electric control unit (ECU) 20.

The OPS receiver 11 measures actual location of the own vehicle OV (e.g., latitude and longitude of the own vehicle OV) by receiving signals from three or more GPS satellites. The GPS receiver 11 transmits information on the actual location of the own vehicle OV to the vehicle support ECU 20.

The map database 12 is a database in which high-precision map information is stored. The map database 12 is formed in, for example, a hard disk drive (HDD) mounted in the own vehicle OV. The high-precision map information includes, for example, positional information (e.g., latitude and longitude) of a compartment line that partitions two lanes, shape information on lanes (e.g., classification such as curved lane and straight lane, and curvature of curved lane, etc.) and positional information on intersections and branch points. The high-precision information includes positional information on borderline BL. The borderline BL is a line by which a drivable area and undrivable area of the vehicle are separated. For example, if curbs are installed along the compartment line, the borderline BL corresponds to a line extending parallel to the compartment line along the side faces of these curbs in a compartment line side.

The millimeter wave radar 13 launches millimeter wave (an example of electromagnetic wave) around the own vehicle OV and detects the landmark by receiving reflective wave reflected by the landmark. According to millimeter wave radar 13, it is possible to estimate relative speed of the landmark to the own vehicle OV based on time interval between launching millimeter wave and receiving reflected wave. According to millimeter wave radar 13, it is also possible to estimate relative position of the landmark to the own vehicle OV based on direction in which the reflective wave goes to the own vehicle OV. The millimeter wave radar 13 transmits relative quantity composing of relative speed and relative position to the vehicle support ECU 20 as landmark information.

The LIDER 14 detects the landmark by irradiating a laser emitting pulses around the own vehicle OV and receiving reflected laser light from the landmark. Likewise the millimeter wave radar 13, according to the LIDER 14, it is possible to estimate the relative speed and the relative position (i.e., the relative quantity) of the landmark relative to the own vehicle OV. In addition to, according to the LIDER 14, it is possible to recognize outer shape of the landmark (e.g., height and width). The LIDER 14 transmits the relative quantity and the other shape of the landmark to the vehicle support ECU 20 as landmark information.

The vehicle support ECU 20 is a control unit including a central processing unit (CPU), a read only memory (ROM), a random access memory (RAM), a controller area network (CAN) communication device, etc. In the vehicle support ECU 20, for example, program stored in the ROM is loaded into the RAM, and the program loaded in the RAM is executed by the CPU to realize various functions. The vehicle support ECU 20 may be composed of a plurality of electronic control units.

2. Configuration of Vehicle Support ECU 20

Next, a functional configuration of the vehicle support ECU 20 will be described. The vehicle support ECU 20 has a function to recognize the landmarks existing around the own vehicle OV. Also, the vehicle support ECU 20 has a function to execute various travel assist control. The function to recognize the landmarks is realized by a lane shape/position estimation portion 21, a landmark fusion portion 22, an object estimation portion 23 and an estimation line set portion 25 which are included in the vehicle support ECU 20. The function to execute the various travel assist control is realized by a drive support control portion 24. These portions 21 to 25 do not exist as hardware in the vehicle support ECU 20, but are realized as software when the program stored in the ROM is executed by the CPU.

Figure 2:
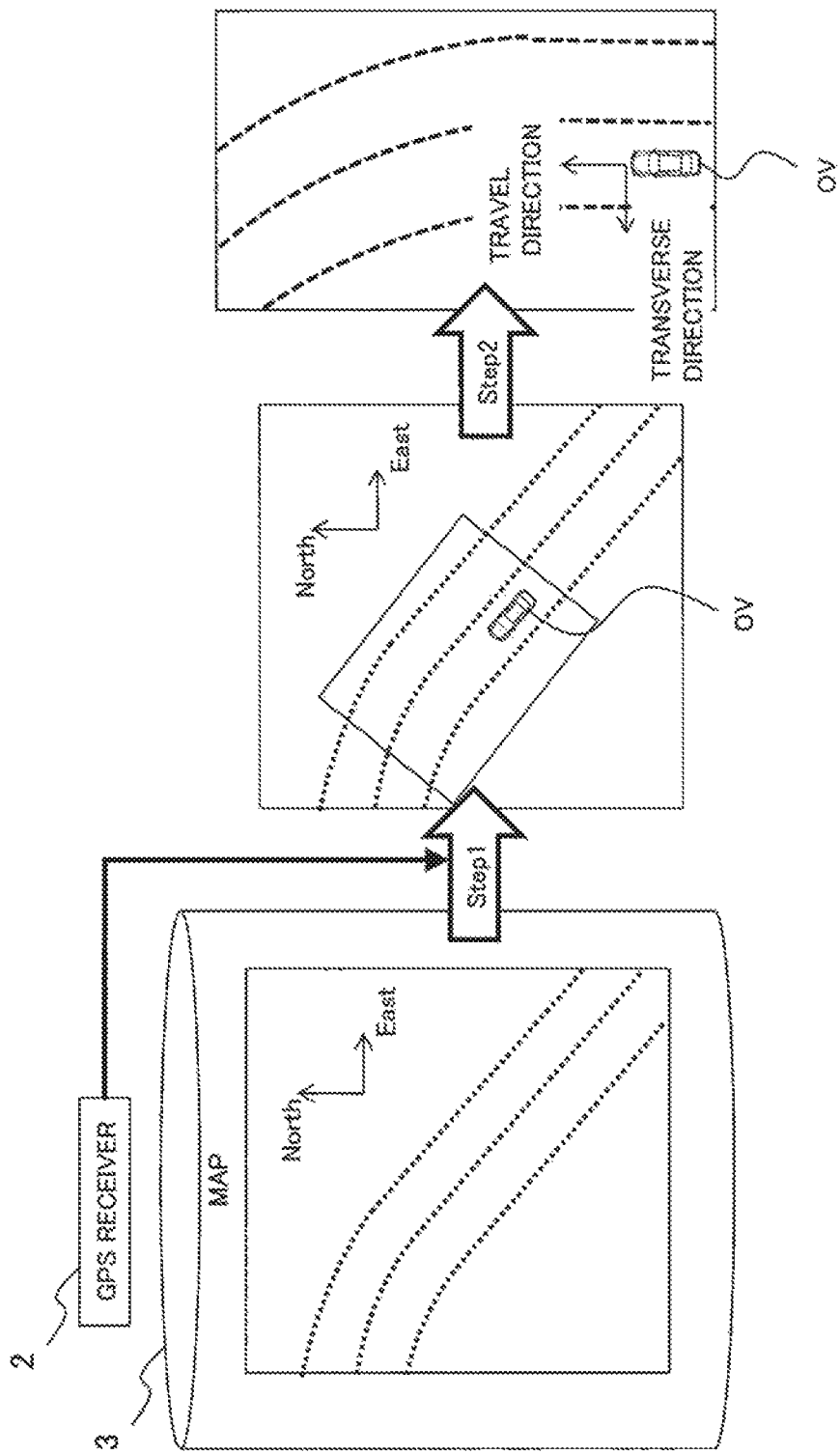
FIG. 2 is a diagram for describing an example of estimate processing by a lane shape/position estimation portion.

The portion 21 executes estimate processing to estimate shape and position of lanes around the own vehicle OV. FIG. 2 is a diagram for describing an example of estimate processing by the portion 21. The estimate processing shown in FIG. 2, first, the positional information on compartment lines around the own vehicle OV is read from the map database 12 based on the information on the actual location from the GPS receiver 11. Then, this positional information is transformed into a rectangular plane coordinate system (Step 1). Subsequently, this rectangular plane coordinate system is converted into a reference frame whose origin is a reference point of the own vehicle OV (Step 2). The y-axis of this reference frame corresponds to a travel direction of the own vehicle OV (a vehicle's length direction) and the x-axis corresponds to a transverse direction (a vehicle's width direction) of the own vehicle OV. The method for estimating the shape and position of the lane applicable to the present disclosure is not particularly limited. That is, the shape and position of the lane may be estimated by a known method.

The portion 22 executes fusion processing of the landmark separately detected by the millimeter wave radar 13 and the LIDER 14. From the millimeter wave radar 13 and the LIDER 14 to the portion 22, information on a plurality of landmarks existing around the own vehicle OV is continuously transmitted. In the fusion processing by the portion 22, based on the landmark information, it is determined whether or not the landmark detected by a certain wide-angle radar (e.g., the millimeter wave radar 13) is identical to the landmark detected by the other wide-angle radar (e.g., the LIDER 14). When the same type of the wide-angle radars (e.g., three millimeter wave radars 13) are mounted at different positions of the own vehicle OV (e.g., front left, front middle and front right of the own vehicle OV), it is judged in the fusion processing that whether or not the landmarks detected by these wide-angle radars are identical.

In the fusion processing by the portion 22, the relative quantities of the landmarks which were determined to be the same object are integrated. The method for integrating the relative quantity applicable to the present disclosure is not particularly limited. That is, the relative quantity may be integrated by a known method. For example, it may be integrated by obtaining the average value of the relative quantity. It may be integrated by weighting according to the characteristics of the wide-angle radar. It may be integrated by a stochastic estimation method using a Kalman filter or the like.

The portion 23 executes processing to estimate, based on each relative quantity of the landmarks after the fusion processing, whether or not each landmark corresponds to an object to be noted for travel assist control. Details of this estimate processing will be described later.

The portion 24 executes processing to set each control amount of the travel assist control for prevent the own vehicle OV from a collision with the landmark which was estimated to correspond to the object to be noted for travel assist control in the estimation processing by the portion 23 (hereinafter also referred to as a "targeted landmark OB"). The travel assist control includes drive control, braking control and steering control. The braking control includes deceleration control in which the own vehicle OV reduces speed according to the relative quantity of the targeted landmark OB. The steering control includes lane change control in which a lane along which the own vehicle OV travels is changed according to steering torque which was set, based on the relative quantity of the targeted landmark OB.

Figure 3:
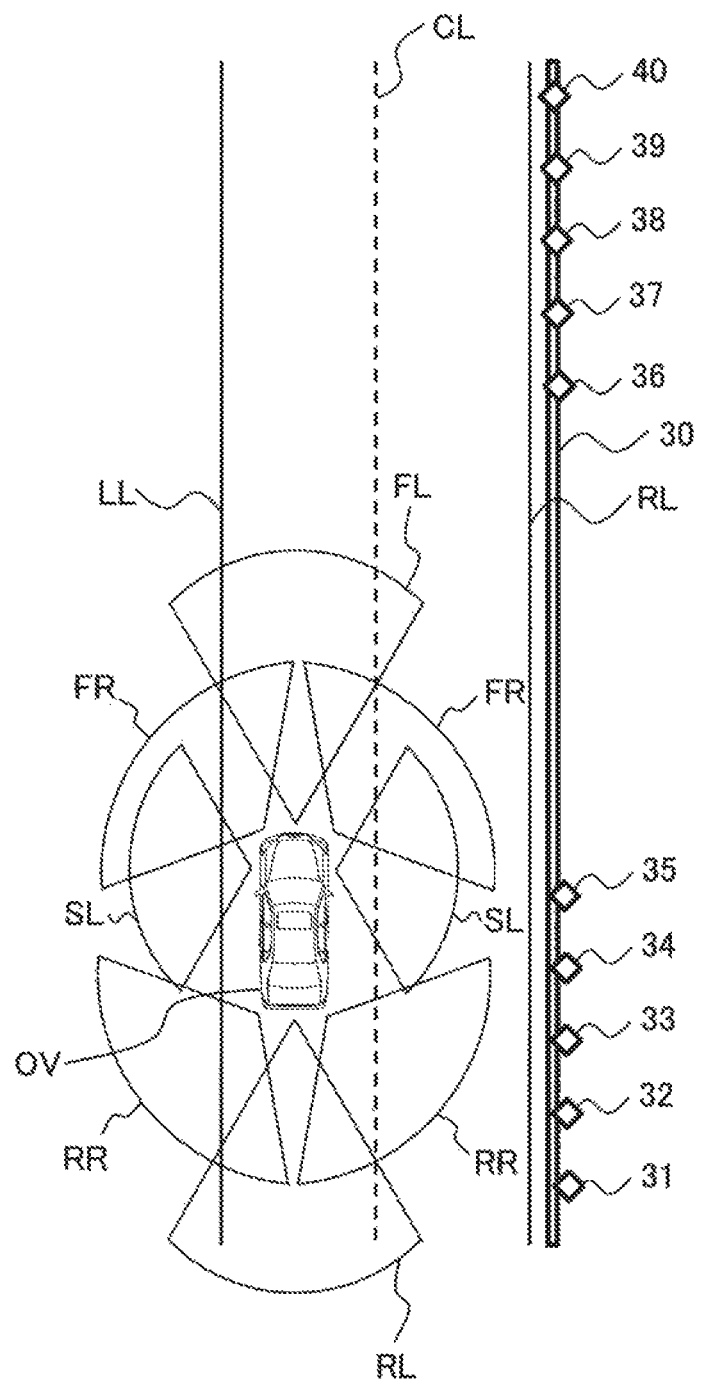
FIG. 3 is a diagram for describing an example of setting processing by a drive support control portion.
Figure 4:
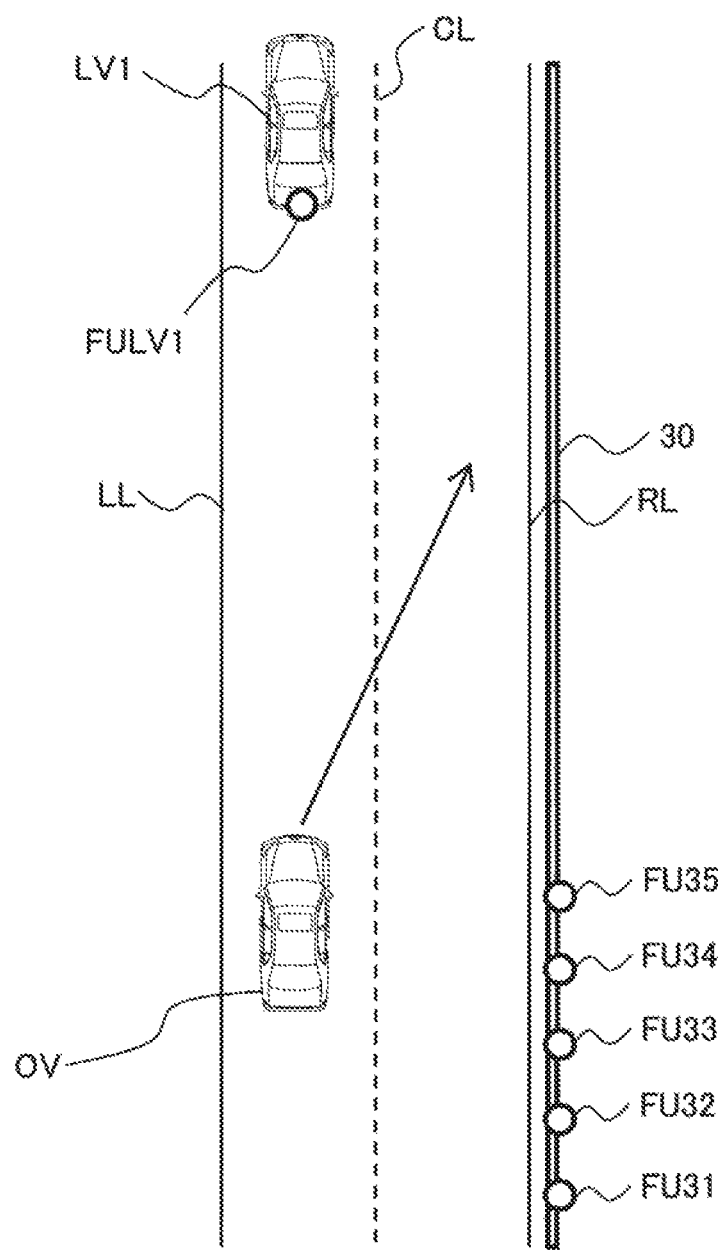
FIG. 4 is a diagram for describing an example of the setting processing by the drive support control portion.
Figure 5:
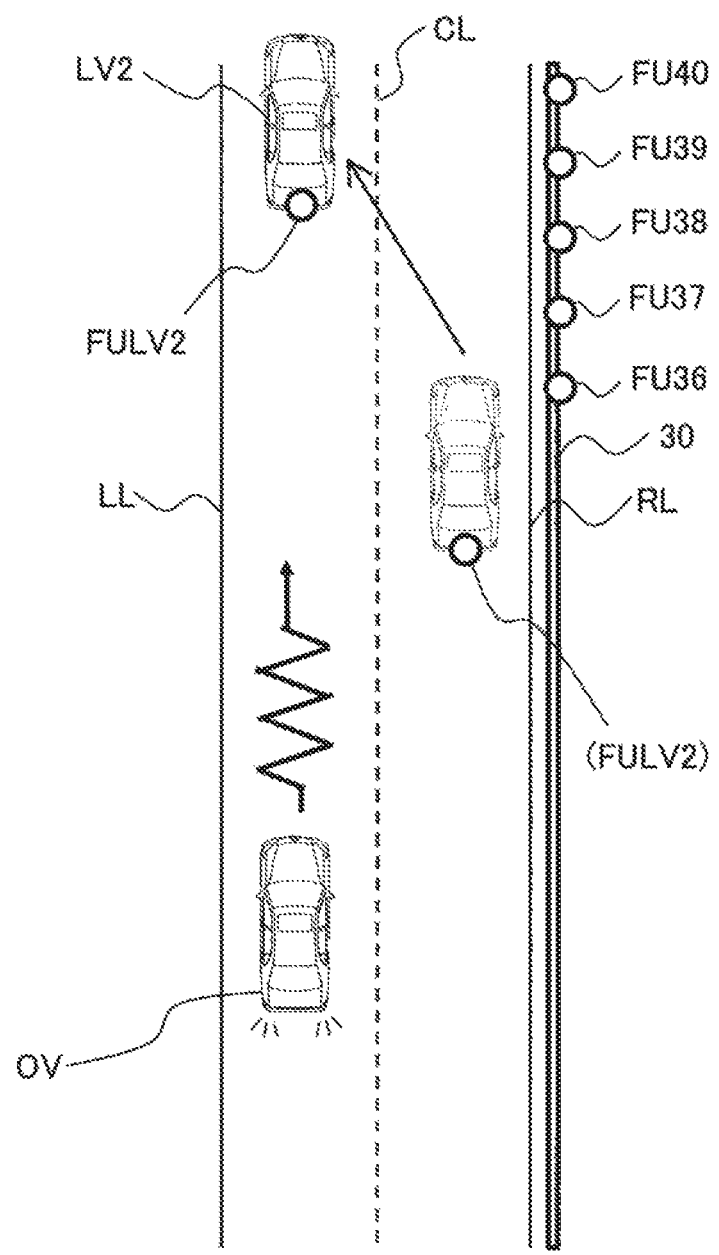
FIG. 5 is a diagram for describing an example of the setting processing by the drive support control portion.

FIGS. 3 to 5 are diagrams for describing an example of the setting processing executed by the portion 24. For convenience of explanation, in FIGS. 3 to 5 a left lane comparted by a center line CL and a leftward line LL and a right lane comparted by the center line CL and a right side line RL are drawn. In addition, each of the own vehicle OVs shown in FIGS. 3 to 5 travels on the left lane, and a guard rail 10 as installed outside the right lane. The guard rail 30 is composed of beams (wave type rigid plates and poles for supporting the beams. Each of delineators 31 to 40 are attached to each tip of the poles. The poles of the guard rail 30 are arranged at substantially equal intervals thereby the delineators 36 to 40 are also arranged at substantially equal intervals.

In FIG. 3, a plurality of fa shaped areas are drawn around the own vehicle OV. Each center angle of these fan-shaped areas corresponds to an irradiation angle of multiple wide-angle radars mounted on the own vehicle OV. Specifically, these wide-angle radars are the millimeter wave radars FR and RR installed at total of four places in front and rear of the own vehicle OV and LIDERs FL, RL and SL installed at total of four places in the front, rear and side of the own vehicle OV. Note that installation positions and number of these wide-angle radars are not limited to the example shown in FIG. 3. The guard rail 30 and the delineators 31 to 40 are separately detected by these wide-angle radars. And by the execution of the fusion processing by the portion 22, the relative quantities of these landmarks are integrated. Note that if the landmark is detected by only one radar among the wide-angle radars, the relative quantity of the landmark after the fusion processing matches the relative quantity of the landmark estimated by the one radar.

In FIG. 4, the reference frame after the fusion processing by the portion 22 is schematically drawn. Symbols "FU31" to "FU35" shown in FIG. 4 indicate processed locations of the delineators 31 to 35 after fusion processing. In the example shown in FIG. 4, a leading vehicle LV1 which travels in front of the own vehicle OV in the left lane is drawn. At least one of the wide-angle radars described above detects the leading vehicle LV1. A symbol "FULV1" shown in FIG. 4 indicates processed position of the leading vehicle LV1 after the fusion processing.

In the setting processing by the portion 24, a predicted collision time TTC (i.e., time to collision) is calculated based on the relative quantity of the leading vehicle LV1 after the fusion processing. The predicted collision time TTC is calculated based on, for example, the relative speed of the leading vehicle LV1 and an inter-vehicle distance between the own vehicle OV and the leading vehicle LV1. When the predicted collision time TTC is calculated, a risk that the own vehicle OV collides with the leading vehicle LV1 is evaluated using the predicted collision time TTC. Then, when the risk is evaluated to be high, the steering torque of the own vehicle OV is set so as to execute the lane change control to change the lane to the right lane. Note that the set steering torque is transmitted to, for example, a steering ECU (not shown). As a result, the steering wheel of the own vehicle OV is automatically steered.

However, if it is assumed that lane change control is executed based on the set steering torque and also when the risk that the own vehicle OV to collide with the other vehicles in the right lane is evaluated to be high, it is determined that the lane change control is unable to he carried out safely. In this case, therefore, deceleration of the own vehicle OV is set so as to execute the deceleration control instead of the lane change control. The set deceleration is transmitted to, for example, a brake ECU (not shown). As a result, the automatic break is activated and the own vehicle OV reduces its speed.

Likewise FIG. 4, the reference frame after the fusion processing by the portion 22 is schematically drawn in FIG. 5. Symbols "FU36" to "FU40" shown in FIG. 5 indicate processed locations of the delineators 36 to 40 after the fusion processing. In the example shown in FIG. 5, a leading vehicle LV2 which changes its traveling lane from the right lane to the left lane and pulls in front of the own vehicle OV is drawn. At least one of the wide-angle radars described above detects this leading vehicle LV2. A symbol "FULV2" shown in FIG. 5 indicates processed location of the leading vehicle LV2 after the fusion processing.

In the setting processing by the portion 24, it is also determined whether the leading vehicle LV 2 corresponds to the interruption vehicle based on the relative quantity of the leading vehicle LV2 after the fusion processing. For example, when the leading vehicle LV 2 crosses the center line CL, it is determined that the leading vehicle LV2 corresponds to the interruption vehicle. In addition, in the setting processing by the portion 24, the predicted collision time TTC is calculated when it is determined that the leading vehicle LV2 corresponds to the interruption vehicle. The predicted collision time TTC is calculated, for example, based on the relative speed of the leading vehicle LV 2 and an inter-vehicle distance between the own vehicle OV and the leading vehicle LV2. When the predicted collision time TTC is calculated, a risk that the own vehicle OV collides with the leading vehicle LV2 is evaluated using the predicted collision time TTC. Then, when the risk is evaluated to be high, deceleration of the own vehicle OV is set so as to execute the deceleration control. When the deceleration of the own vehicle OV is set, the automatic break is activated and the own vehicle OV reduces its speed.

3. Detail of Object Estimation Portion 23
3.1 Problems in Fusion Processing by Landmark Fusion Portion 22

The examples described in FIGS. 4 and 5 are based on an assumption that the guard rail 30 and the delineators 31 to 40 are correctly integrated in the fusion processing by the 22. However, as already described that the guard rail 30 and the delineators 31 to 40 are arranged at substantially equal intervals. Therefore, in the fusion processing, the poles of the guard rail 30 which are originally separate poles have potential to be treated as a single landmark. Likewise the poles, the delineators 31 to 40 have the potential to be treated as a single landmark. In these cases, if the processed location of the mistaken landmark moves to the transverse direction, it might be incorrectly recognized to locate in the right lane. In addition, if the size of the mistaken landmark is incorrectly recognized, it might be incorrectly recognized as another vehicle travelling on the right lane.

Figure 6:
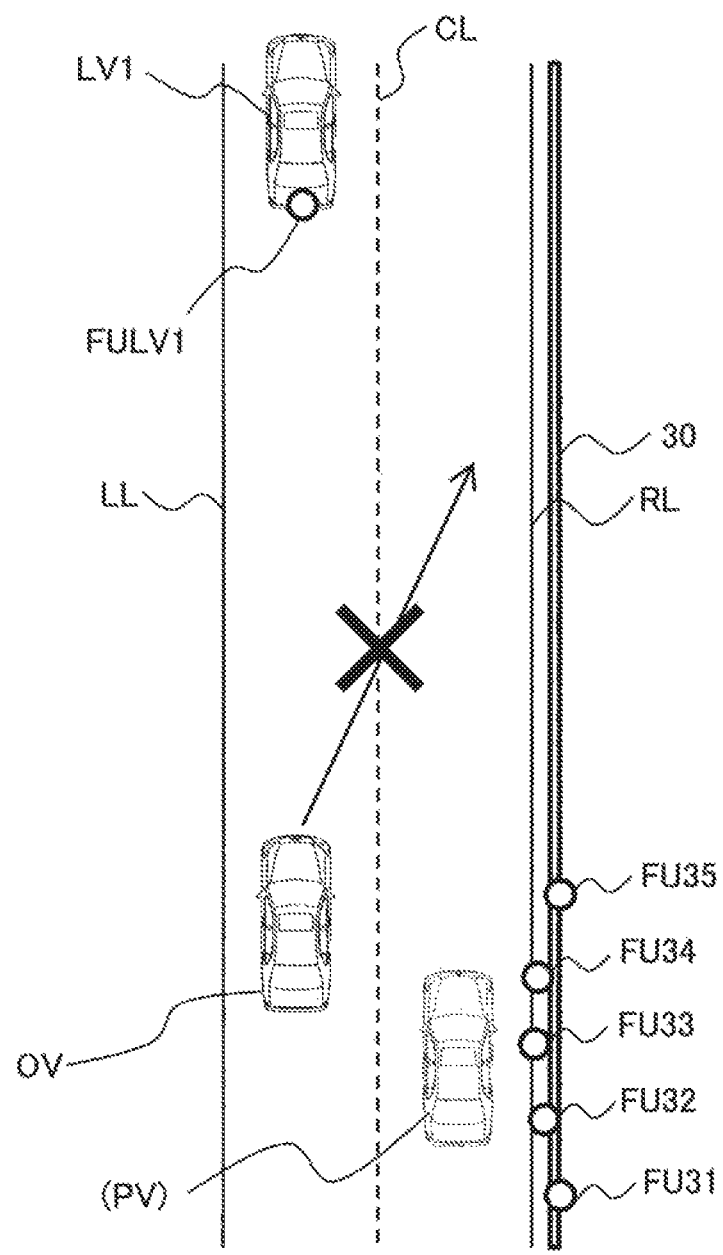
FIG. 6 is a diagram for describing a problem when delineators which were processed in fusion processing are incorrectly recognized as another vehicle traveling in a right lane.

FIG. 6 is a diagram for describing a problem when the processed delineators 31 to 35 after the fusion processing were incorrectly recognized as another vehicle traveling in the right lane. Likewise FIG. 4, the symbols "FU31" to "FU35" shown in FIG. 6 are the processed locations of the delineators 31 to 35 after the fusion processing. Also, the symbol "FULV1" shown in FIG. 6 is the processed position of the leading vehicle LV1 after the fusion processing. If the delineators 31 to 35 were incorrectly recognized as another vehicle, it might be incorrectly determined that there is in the right lane a vehicle PV traveling side-by-side with the own vehicle OV.

As described above, in the example shown in FIG. 4, the steering torque of the own vehicle OV was set so as to execute the lane change control when the risk to collide with the leading vehicle LV1 is evaluated to be high. However, in the example shown in FIG. 6, it might be determined that the lane change control based on the set steering torque is unable to be carried out safely. Then, the execution of lane change control might be canceled and the driver of the own vehicle OV who expects the execution of the lane change control feels a sense of incompatibility.

Figure 7:
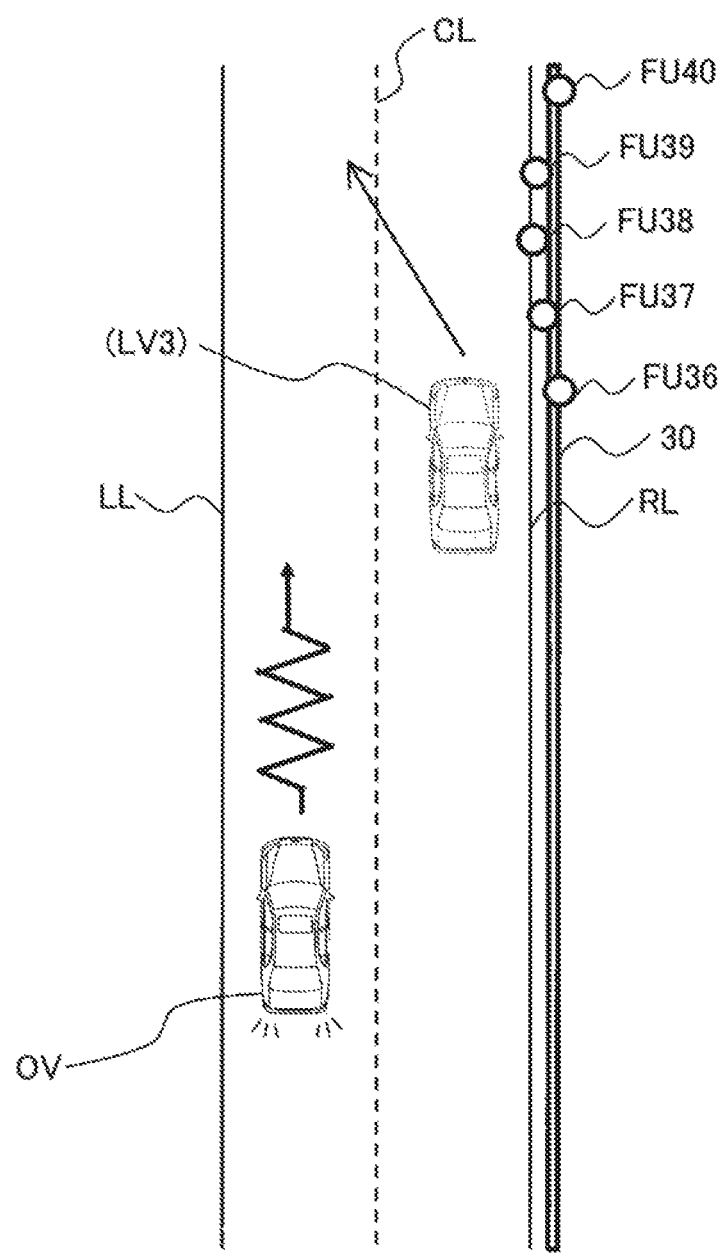
FIG. 7 is a diagram for describing another problem when delineators which were processed in fusion processing are incorrectly recognized a another vehicle traveling in a right lane.

FIG. 7 is a diagram for describing a problem when the processed delineators 36 to 40 after the fusion processing were incorrectly recognized as another vehicle traveling in the right lane. Likewise FIG. 5, the symbols "FU36" to "FU40" shown in FIG. 7 are the processed locations of the delineators 36 to 40 after the fusion processing. Also, the symbol "FULV2" shown in FIG. 7 is the processed position of tire leading vehicle LV2 after the fusion processing, if the delineators 36 to 40 were incorrectly recognized as another vehicle, it might be incorrectly determined that there is a leading vehicle LV3 in the right lane.

As described above, in the example shown in FIG. 5, the deceleration of the own vehicle OV was set so as to reduce its speed when the risk to collide with the leading vehicle LV2 is evaluated to be high. However, in the example shown in FIG. 7, the leading vehicle LV2 shown in FIG. 5 does not exist around the own vehicle OV. In addition, the leading vehicle LV3 does not in fact exist around the own vehicle. Against such the situation, if the risk to collide with the leading vehicle LV3 is evaluated to be high, the deceleration control might be executed base on the set deceleration. Then, the driver of the own vehicle OV who expects normal travel feels the sense of incompatibility.

3.2 Features of Estimate Processing by Object Estimation Portion 23

Figure 8:
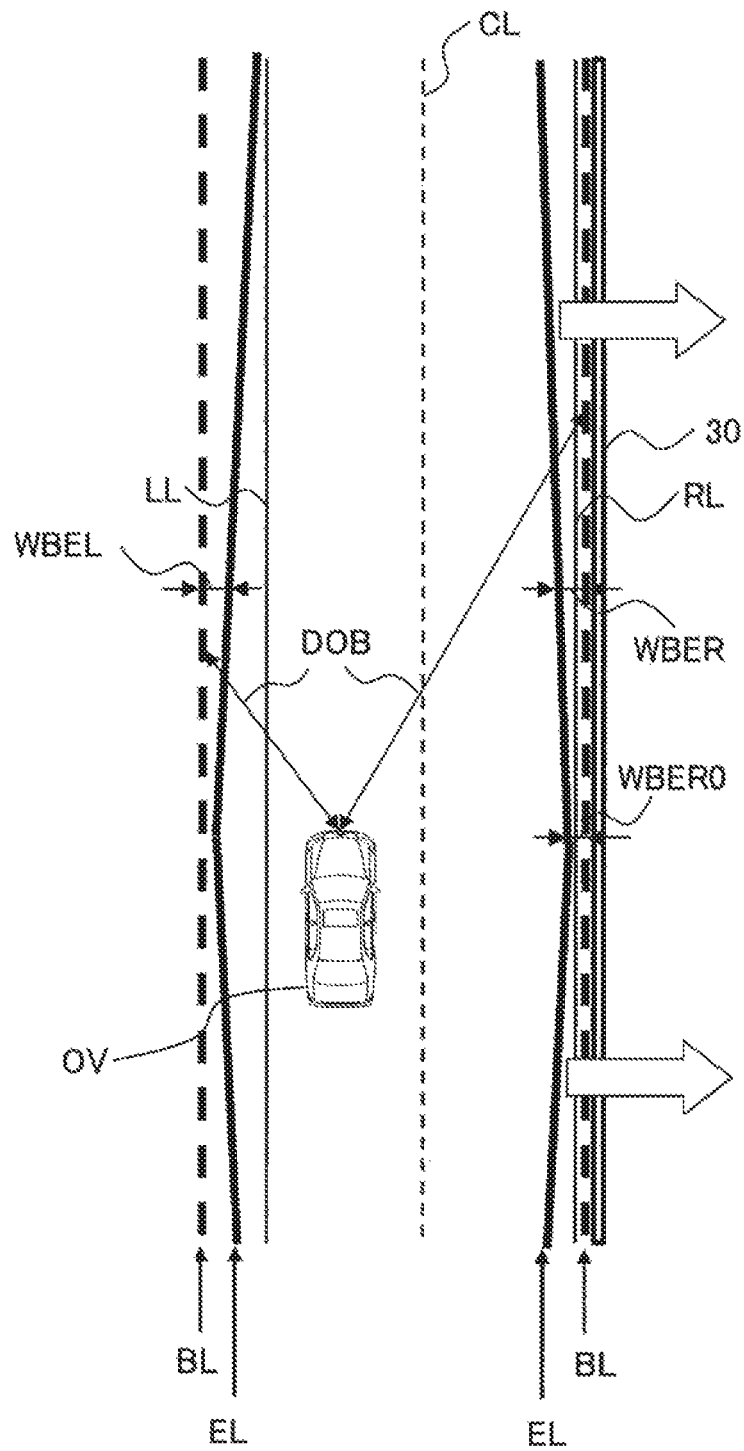
FIG. 8 is a diagram for describing an estimation line used in estimate processing by an object estimation portion.

In consideration of such a problem, in the estimate processing by the portion 23, it is estimated whether or not each of the landmarks corresponds to the object to be noted for travel assist control for the travel assist control based on an estimation line EL which is set by the portion 25 in the reference frame. FIG. 8 is a diagram for describing the estimation line EL used in the estimate processing by the portion 23. In the example shown in FIG. 8, two border line BLs exist on the left side of the leftward Line LL and on the right side of the right side line RL. These borderline BLs are expressed by reflecting the positional information on borderline BL in map database 12 into the reference frame.

Figure 9:
FIG. 9 is a diagram for showing an example of a relationship between distance from the own vehicle to a borderline and a width between borderline and the estimation line in a transverse direction.

The number of the estimation line EL is the same as that of the borderline BL. Therefore, two estimation line ELs are set so as to correspond the left and right borderline BLs. Both left and right estimation line ELs are set to a center line CL side (i.e., an own vehicle side). Both left and right estimation line ELs are set to be substantially parallel to the corresponding borderline BLs, respectively. However, both left and right estimation line ELs are inclined to the center line CL side as a distance DOB from the own vehicle OV to the borderline BL increases. More specifically, a width WBER in the transverse direction between the right borderline BL and the right estimation line EL increases as the distance DOB increases. A width WBEL in the transverse direction between the left borderline BL and the left estimation line EL is similar to the width WBER. FIG. 9 is a diagram for describing an example of a relationship between the distance DOB and the width WBER (or the width WBEL). As shown in FIG. 9, the width WBER at a position where the distance DOB is the shortest is indicated as a width WBER0 (NB, WBER0>0). And the width WBER is increased as the distance DOB becomes longer.

In the estimate processing by the portion 23, it is estimated by using the estimation line ELs that the landmarks which locate at the center line CL side correspond to the object to be noted for travel assist control. On the contrary, it is estimated that the landmarks which locale at a borderline BL side does not correspond to the object to be noted for travel assist control.

3. Effects of Estimation Processing by Object Estimation Portion 23

Figure 10:
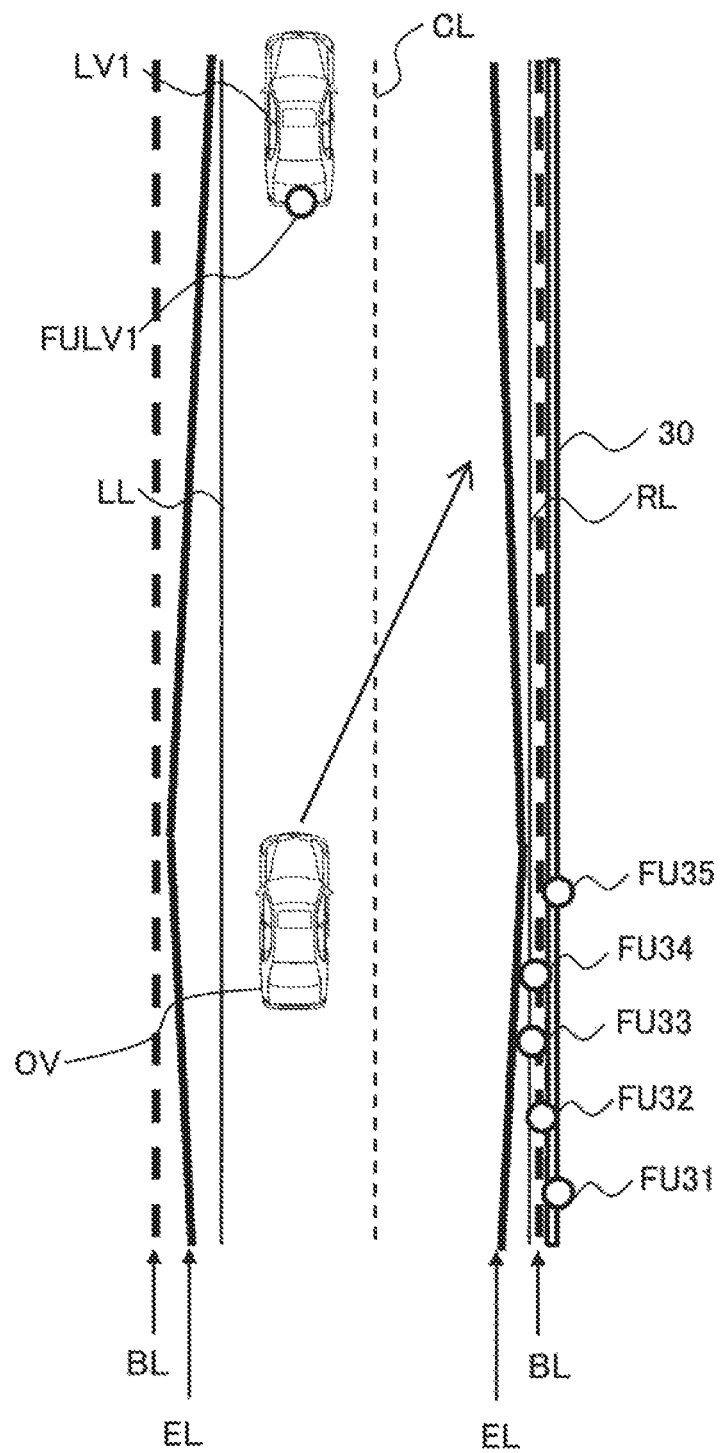
FIG. 10 is a diagram for describing effects of the estimate processing with the estimation line by the object estimation portion.
Figure 11:
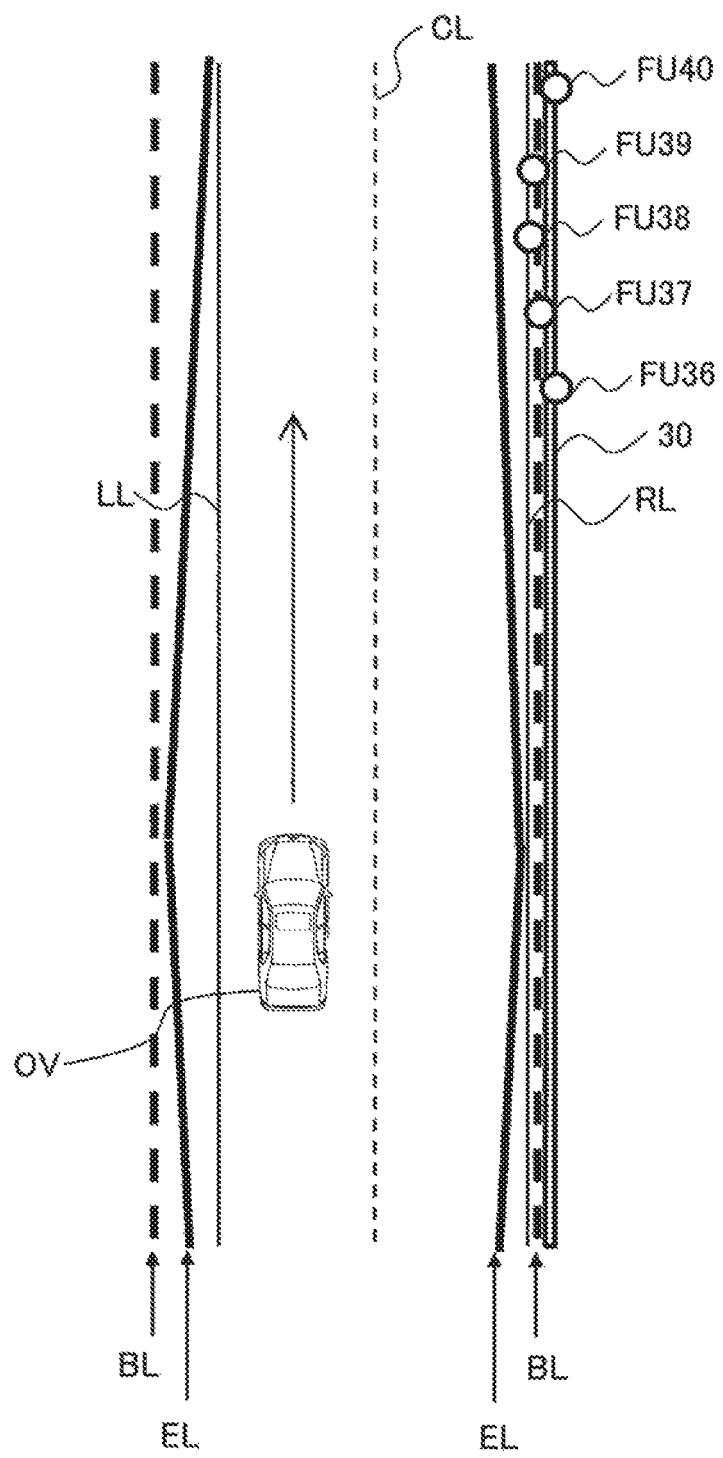
FIG. 11 is a diagram for describing effects of the estimate processing with the estimation line by the object estimation portion.

FIGS. 10 and 11 are diagrams for describing effects of the estimate processing by the portion 23 by using the estimation line ELs. As can be seen by comparing FIGS. 6 and 10, it is estimated in the example of FIG. 10 that each of the processed delineators 31 to 35 after the fusion processing is not the object to be noted for travel assist control. Also, as can be seen by comparing FIGS. 7 and 11, it is estimated in the example of FIG. 11 that each of the processed delineators 36 to 40 after the fusion processing is not the object to be noted for travel assist control. As described above, by applying the estimation line ELs, it is possible to treat the delineators 31 to 40 as untargeted landmark NOBs. Therefore, it is possible to suppress occurrence of troubles caused by the misunderstanding described in FIGS. 6 and 7.

Note that the estimation line ELs may be set in parallel to the borderline BLs. In this case, for example, the width WBER (or the width WBEL) may be set to WBER0 irrespective of the distance DOB. However, as the distance DOB increases, recognition precision in the transverse direction tends to decrease. In this regard, if the estimation line ELs are set to increase the width WBER according to the distance DOB, it is possible to compensate for the degradation in the recognition precision and guarantee accuracy of the estimate processing by the portion 23.

Second Embodiment

A second embodiment of the present disclosure will be described with reference to FIGS. 12 and 11.

1. Configuration of Vehicle Control Device

Figure 12:
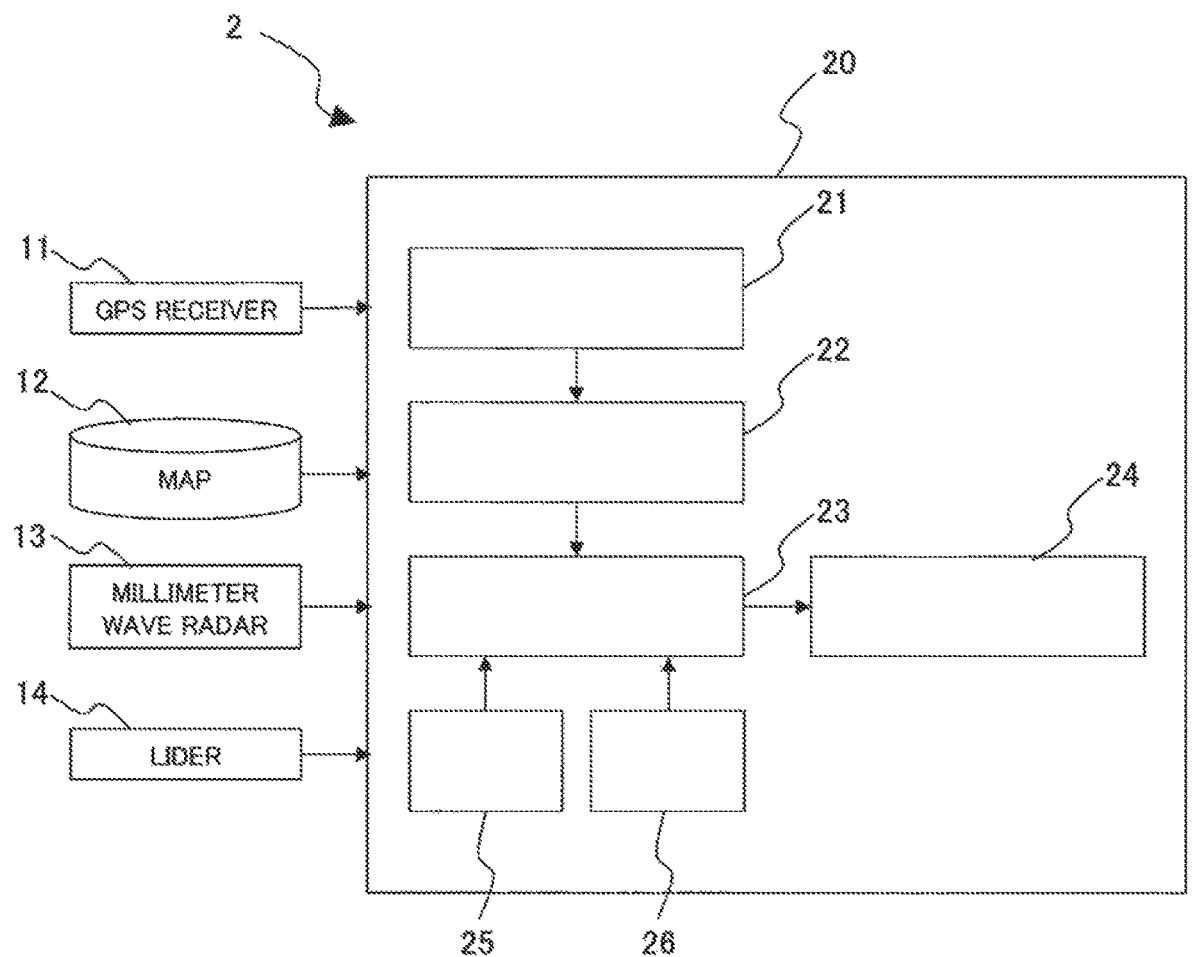
FIG. 12 is a block diagram for showing a configuration of a vehicle control device according to a second embodiment of the present disclosure.

FIG. 12 is a block diagram for describing a configuration of a vehicle control device according to the second embodiment. The configuration of the vehicle control device 2 shown in FIG. 12 is basically the same as that of the vehicle control device 1 shown in FIG. 1. Therefore, description of the common configuration will be omitted. Likewise the vehicle equipped with the vehicle control device 1 shown in FIG. 1, the vehicle equipped with the vehicle control device 2 is mounted is also referred to as an "own vehicle OV".

Unlike the vehicle control device 1 shown in FIG. 1, the vehicle control device 2 shown in FIG. 12 further includes a determination speed area set portion 26. The portion 26 is one of the configuration which realizes the function of the vehicle support ECU 20 to recognize the landmarks around the own vehicle OV. The portion 26 does not exist as hardware in the vehicle support ECU 20, but are realized as software when the program stored in the ROM executed by the CPU.

2. Description of Determination Speed Area Set Portion 26

Figure 13:
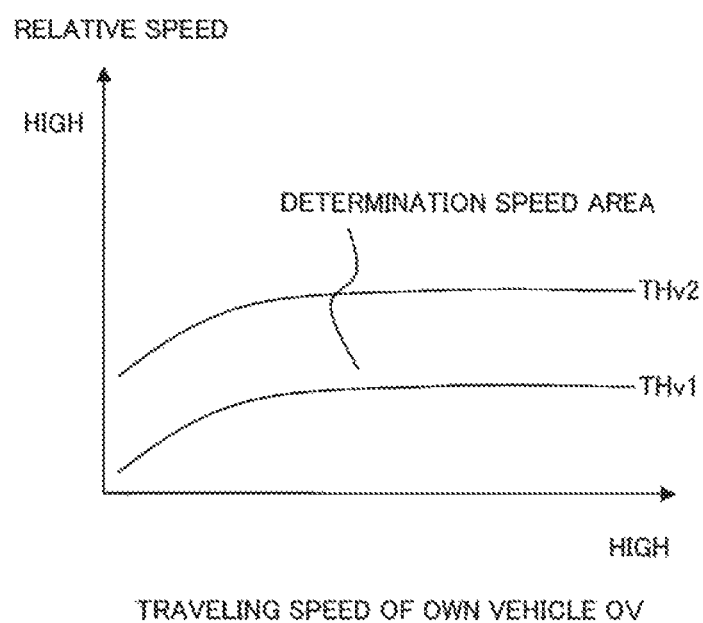
FIG. 13 is a diagram for describing an example of a determination speed area.

The portion 26 sets the determination speed area based on the traveling speed of own vehicle OV. The determination speed area is an area to extract, a landmark which seems to travel side-by-side with the own vehicle OV at a speed close to the traveling speed of own vehicle OV. FIG. 13 is a diagram for describing an example of the determination speed area. As shown in FIG. 13, relative speed THv1 of a lower limit of the determined speed area is set a higher speed value as the traveling speed of the own vehicle OV becomes high. Likewise the relative speed THv1, relative speed THv2 of an upper limit of the determination speed area is set in this example. Note that both the relative speed THv1 and the relative speed THv2 converge to constant values in the high-speed region.

3. Features of Estimate Processing by Object Estimation Portion 23

In the second embodiment, the estimate processing by the portion 23 is executed by a combination of the estimation line EL and the determination speed area. Specifically, it is estimated whether or not the landmark is the object to be noted for travel assist control based on a determination of whether absolute value of the relative speed of the landmark locating on the center line CL side is within the determined speed area. When the absolute value of the relative speed of the landmark locating on the center line CL side is within the determined speed area, it is estimated that the landmark is the object to be noted for travel assist control. Otherwise, it is estimated that the landmark is not the object to be noted for travel assist control.

4. Effects of Estimation Processing by Object Estimation Portion 23

By combining the estimation line EL and the determination speed area, it is possible to extract the landmark that seems to travel side-by-side with the own vehicle OV at the speed close to the traveling speed of own vehicle OV. Therefore, by combining the estimation fine EL and the determination speed area, it is possible to treat the delineators 31 to 40 shown in FIG. 3 as the untargeted landmark NOBs with a high probability. Therefore, it is possible to suppress the occurrence of troubles caused by the misunderstanding described in FIGS. 6 and 7 with a high probability.

Third Embodiment

A third embodiment of the present disclosure will be described with reference to FIG. 14.

1. Configuration of Vehicle Control Device

Figure 14:
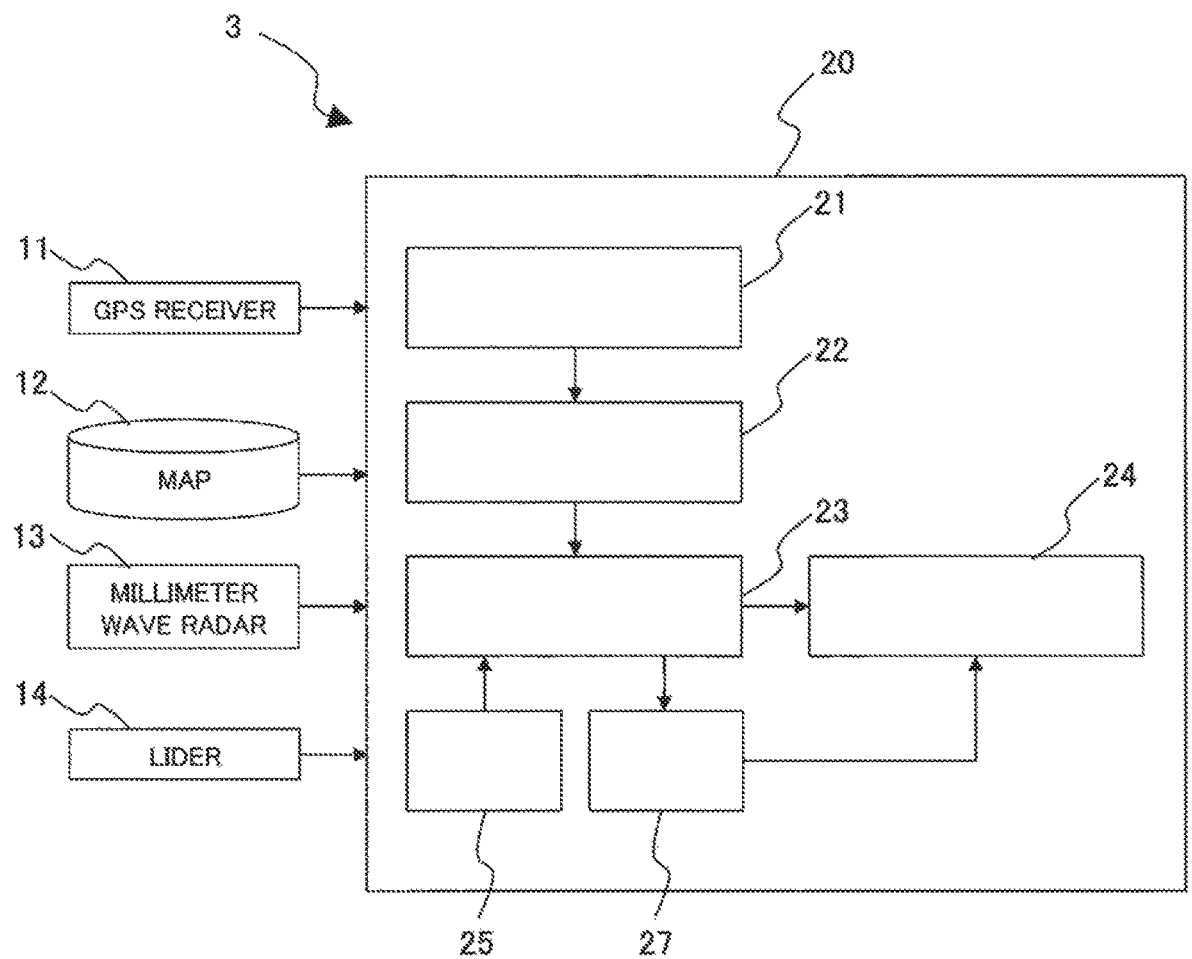
FIG. 14 is a block diagram for showing a configuration of a vehicle control device according to a third embodiment of the present disclosure.

FIG. 14 is a block diagram for describing a configuration of a vehicle control device according to the third embodiment. The configuration of the vehicle control device 3 shown in FIG. 14 is basically the same as that of the vehicle control device 1 shown in FIG. 1. Therefore, description of the common configuration will be omitted. Likewise the vehicle equipped with the vehicle control device 1 shown in FIG. 1, the vehicle equipped with the vehicle control device 3 is mounted is also referred to as an "own vehicle OV".

Unlike the vehicle control device 1 shown in FIG. 1, the vehicle control device 3 shown in FIG. 14 further includes an object re-estimation portion 27. The portion 27 is one of the configuration which realizes the function of the vehicle support ECU 20 to recognize the landmarks around the own vehicle OV. The portion 27 does not exist as hardware in the vehicle support ECU 20, but are realized as software when the program stored in the ROM is executed by the CPU.

2. Description of Object Re-Estimation Portion 27

The portion 27 execute estimation processing based on the relative quantity of the untargeted landmark NOBs which have been estimated in the estimation processing by the portion 23. In the estimate processing by the portion 27, it is exceptionally estimated that the untargeted landmark NOB is the object to be noted for travel assist control when the processed location of the untargeted landmark NOB is kept at the center line CL side than the estimation line over a predetermined time THt1 after the execution of the estimate processing by the portion 23. Alternatively, in the estimate processing by the portion 27, it is exceptionally estimated that the untargeted landmark NOB is the object to be noted for travel assist control when the absolute value of the relative speed of the untargeted landmark NOB is kept larger than a threshold THv3 over a predetermined time THt2 after the execution of the estimate processing by the portion 23. The threshold THv3 is set to a value larger than the relative speed THv2 described above.

3. Effects of Estimation Processing by Object Re-Estimation Portion 27

According to the estimate processing by the portion 27, the untargeted landmark NOB is revaluated after the estimate processing by the portion 23. Therefore, when the untargeted landmark NOB is actually a moving object (for example, a bicycle, a motorbike) which travels in the vicinity of the estimation line EL, it is possible to treat the moving object as the object to be noted for travel assist control. Therefore, it is possible to evaluate the risk to collide with the moving object and execute safely various travel assist control for the vehicle (e.g., the lane change control described in FIG. 4).

What is claimed is:

1. A vehicle control device comprising:
a wide-angle radar which is configured to detect landmarks around an own vehicle;
a map database which includes information on borderlines by which a drivable area and an undrivable area of a vehicle are separated;
an estimation line set portion which is configured to execute setting processing to set an estimation line around the own vehicle based on a location of the own vehicle and the information on borderlines, wherein the estimation line extends substantially parallel to the borderline on an own vehicle side than the estimation line; and
an object estimation portion which is configured to execute estimation processing to estimate whether or not the landmark is an object to be noted for travel assist control including the drive control, braking control and steering control of the own vehicle,
wherein the estimation processing includes processing:
to determine that the landmark is the object to be noted for travel assist control when the detecting position of the same landmark is at the own vehicle side than the estimation line; and
to determine that the landmark is not the object to be noted for travel assist control when the detecting position of the same landmark is not at the own vehicle side than the estimation line.

2. The vehicle control device according to claim 1, further comprising:
a relative speed calculation portion which is configured to calculate relative speed of the landmark to the own vehicle; and a determined speed are set portion which is configured to set a determination speed area in accordance with traveling speed of the own vehicle, wherein the estimate processing includes processing:

to determine that the landmark is the object to be noted for travel assist control when the detecting position of the same landmark is at the own vehicle side than the estimation line and also absolute value of the relative speed of the same landmark is within the determination speed area; and to determine that the landmark is not the object to be noted for travel assist control when the absolute value of the relative speed of the same landmark is out of the determination speed area.

3. The vehicle control device according to claim 1, further comprising:

an object re-estimation portion which is configured to execute re-estimation processing to estimate again whether or not the landmark is the object to be noted for travel assist control, wherein the re-estimation processing includes processing to exceptionally estimate that an untargeted landmark which has been estimated not to the object to be noted for travel assist control in the estimation processing is the object to be noted for travel assist control when the detecting position of the same untargeted landmark is kept at the own vehicle side than the estimation line over a predetermined time after the execution of the estimate processing.

4. The vehicle control device according to claim 2, further comprising:

a relative speed calculation portion which is configured to calculate relative speed of the landmark to the own vehicle; and an object re-estimation portion which is configured to execute re-estimation processing to estimate again whether or not the landmark is the object to be noted for travel assist control, wherein the re-estimation processing includes processing to exceptionally estimate that an untargeted landmark which has been estimated not to the object to be noted for travel assist control in the estimation processing is the object to be noted for travel assist control when the absolute value of the relative speed of the same untargeted landmark is kept larger than predetermined speed over a predetermined time after the execution of the estimate processing.

5. The vehicle control device according to claim 1, wherein the setting processing further includes processing to set the estimation line by tilting the estimation line toward the own vehicle as a distance from the own vehicle to the borderline increases.

6. The vehicle control device according to claim 1, wherein the information on borderlines includes positional information, wherein each of the borderlines is a line that extends parallel to a compartment line, and wherein the compartment line is a line that partitions two lanes.

7. A vehicle control device for a vehicle, comprising:

a wide-angle radar which is configured to detect a landmark around the vehicle;

a map database which includes information on borderlines by which a drivable area and an undrivable area of the vehicle are separated; and an electronic control unit (ECU) programmed to:

set an estimation line based on a location of the vehicle and the information on borderlines, wherein the estimation line extends substantially parallel to one of the borderlines and is positioned between the vehicle and the one of the borderlines; and estimate whether or not the landmark is an object to be noted for travel assist control including drive control, braking control and steering control of the vehicle, wherein the landmark is the object to be noted for travel assist control when the landmark is located on a same side of the estimation line as the vehicle and the landmark is not the object to be noted for travel assist control when the landmark is not located on the same side of the estimation line as the vehicle.

* * * * *